June 22, 1937.　　　　C. C. WILSON　　　　2,084,544
PANEL FASTENER
Filed June 26, 1935
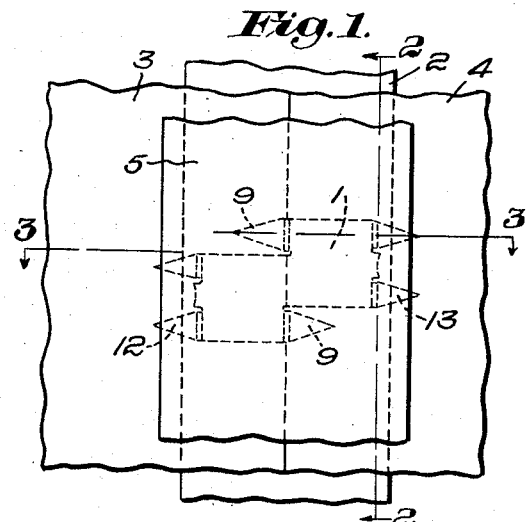
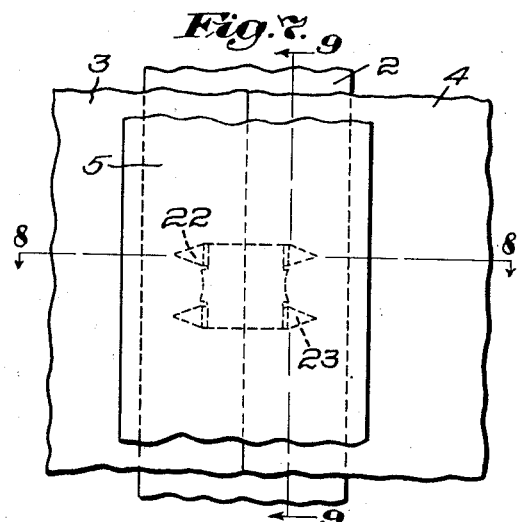
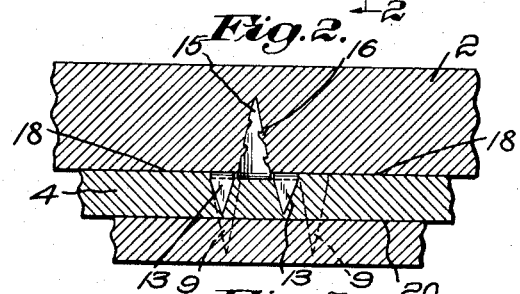
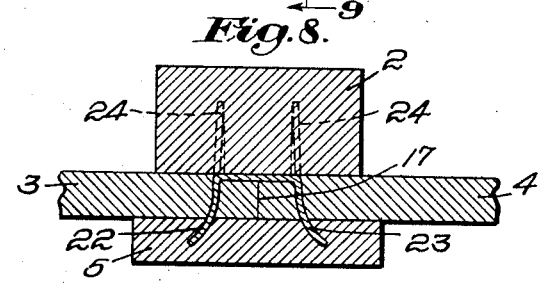
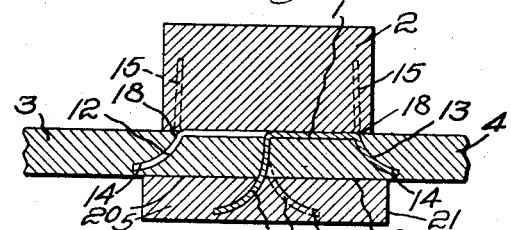
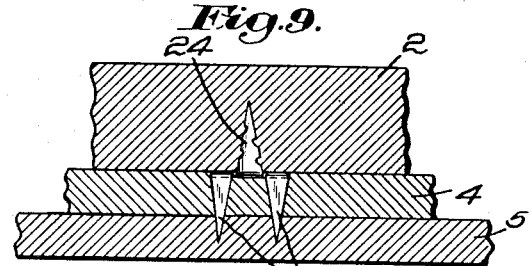
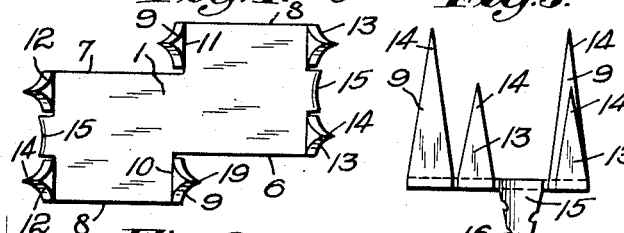
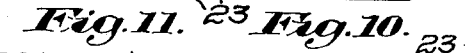
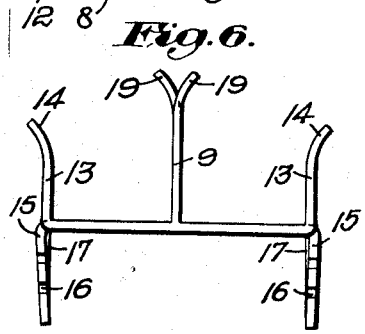
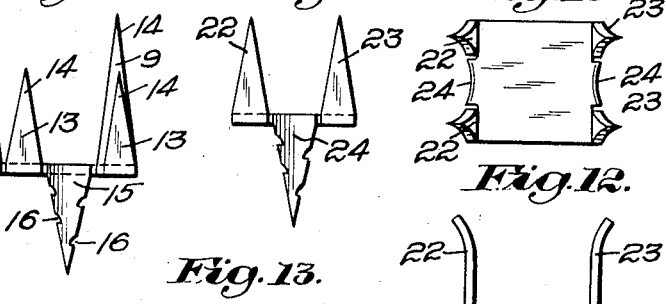
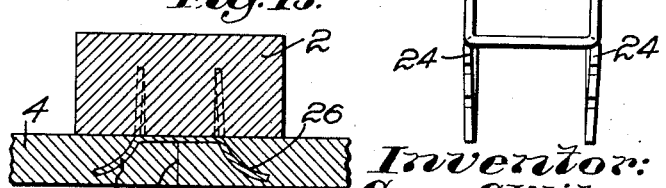
Inventor:
Cary C. Wilson
by Walter S. Jones
Atty.

Patented June 22, 1937

2,084,544

UNITED STATES PATENT OFFICE 2,084,544

PANEL FASTENER

Cary C. Wilson, Claremont, N. H., assignor to United-Carr Fastener Corporation, Cambridge, Mass., a corporation of Massachusetts Application June 26, 1935, Serial No. 28,473

8 Claims. (Cl. 72—118)

This invention relates to a fastener designed to provide for the ready attachment of wallboards, finishing strips and the like interior building materials to a supporting structure and a fastener secured installation of the same.

In the drawing which represents preferred embodiments of my invention:

Figure 1 is a plan view of a building material installation showing the use of one form of my improved fastener member which is represented by the dotted line;

Fig. 2 is a section taken along the line 2—2 of Fig. 1;

Fig. 3 is a section taken along the line 3—3 of Fig. 1 with the addition of a metal casing attached to a member of the installation;

Fig. 4 is a front plan view of the fastener member shown in Fig. 1;

Fig. 5 is an end view of the fastener member shown in Fig. 4;

Fig. 6 is a side view of the fastener member shown in Fig. 4;

Fig. 7 is a plan view of a building material installation showing the use of a modified form of my fastener member which is represented by the dotted line;

Fig. 8 is a section taken along the line 8—8 of Fig. 7;

Fig. 9 is a section taken along the line 9—9 of Fig. 7;

Fig. 10 is a front plan view of a modified form of my invention shown by Fig. 7;

Fig. 11 is an end view of the fastener member shown in Fig. 10;

Fig. 12 is a side view of the fastener member shown in Fig. 10; and

Fig. 13 is a section of a third form of fastener secured building installation with a fastener for the same.

My invention as illustrated by the drawing is particularly, though not exclusively, adapted for securing a wallboard of a sheet material such as that formed from wood-fiber, pulp wood, cane and other basic matters to structural beams or studs.

A further object of my invention is to provide a fastener which when assembled with the wallboard and the supporting studs will provide a means for attaching a finishing strip or latticework to the wallboard for the purpose of giving a pleasing appearance to the wallboard material by concealing any irregularities or unattractive markings formed at the point at which one panel of wallboard material is joined to another.

In Figs. 1-3 I have shown my improved fastener member 1 in assembly with a beam or studding 2, the wallboard panels 3 and 4 and a decorative finishing strip 5.

Referring specifically to the fastener member itself, I have shown one form in Figs. 4-6. In this instance the fastener is made up of a single piece of sheet metal material having a base 1 which is formed into the shape shown in Fig. 4 by cutting away a portion of each side from opposite ends toward the center along the lines 6 and 7 parallel to the sides 8—8 of the plate. Enough material is left from these cut-away portions to form the prongs 9—9 which are located on opposite sides near the center of the plate and adjacent to those parts of the plate 10 and 11 which bound the inside ends of the cut-away portions.

From opposite ends of the plate I have stamped out the prongs 12—12 and 13—13 which are so located in my preferred form that they are integral with the edges of the plate ends and adjacent to the lateral edges 8—8. The prongs 12—12 and 13—13 are relatively shorter than the prongs 9—9 for the purpose which will be hereinafter described. Each of the prongs 9—9, 12—12 and 13—13 are, in my preferred form, substantially triangular in shape and have their free ends 14 slightly curled in an outward direction as is best shown in Fig. 6.

From points on the opposite ends of the plate 1 intermediate to the prongs 12—12 and 13—13 and adjacent to the edges of the plate ends, I have stamped out the prongs 15—15 which extend away from the plate in a direction opposite to that of the prongs 9—9, 12—12 and 13—13. The prongs 15—15 are substantially triangular in shape with pointed ends and provided with notches 16 along their free edges, and, in order that they may withstand all strains during the process of attachment, I have constructed them so as to have a slightly bow-shaped cross-section as suggested at the point 17 of Fig. 6.

In assembling my fastener member with its component parts, the plate 1 is placed upon the studding 2 so that the prongs 9—9 will be in close proximity to the center of the studding (Fig. 1). Then by a suitable tool, pressure is exerted on the plate 1 on its surface opposite to that facing the studding to force the prongs 15—15 into the studding until the plate 1 lies adjacent to the studding, as shown in Fig. 3. The bow-shaped construction of the prongs 15—15 is of great importance during the attaching process as described above as it will prevent them from bending over so that the prongs will be able to enter the studding in lines substantially perpendicular to the plate 1, and the notches 16 on the free edges of the prongs will insure a secure engagement after they have once been seated in the studding.

As many fasteners as will be needed are attached to the studding 2 in the manner described above and then the wallboard panels 3 and 4 are correctly positioned on the outwardly projecting prongs 9—9, 12—12 and 13—13 so that when in final location the panels will be contingent to each other along the line 17. The panels 3 and 4 are now by any suitable method, as by a light tapping with a hammer around the fasteners, pressed onto the fasteners until each of their faces 18 lies in close relationship to the studding 2, as shown in Figs. 2 and 3. The prongs 12—12 and 13—13 will be embedded in their respective panels 3 and 4 and because of the curled points of the free ends 14 the prongs will follow this curve as they penetrate into the wallboard thereby causing the ends 14 to be slightly flattened out after complete entrance whereby an easy withdrawal of the prongs from the wallboard will be impossible. Another advantage of my curled ends is that the ends will not project through the panels so that it is not necessary to turn back these ends after the panels are in final position. The ends 19 of the longer prongs 9—9 will project through the panels 3 and 4 for a distance, in relation to the thickness of the finishing strip 5, which will allow the strip to be secured against the outside faces 20 of the panels by a means similar to that by which the panels were secured to the supporting structure.

The intially curled ends 19 of the prongs 9—9 will flatten out during penetration into the strip 5 in precisely the way of the free ends 14 of the prongs 12—12 and 13—13 as described above, thereby holding the strip 5 in secure engagement with the fastener member. Because the prongs 9—9 do not extend through the strip 5, it may be originally provided with a decorative metal casing 21 such as shown in Fig. 3.

In Figs. 7–9 I have shown another form of fastener member installed with the studding, wallboard panels and finishing strip. The fastener used in this installation comprises a substantially square plate with the prongs 22—22 and 23—23 extending outwardly from the edges of opposite ends of the plate (Figs. 10–12). These prongs are intially curled at their free ends in the manner of the prongs 9—9, 12—12 and 13—13 of Figs. 4–6. Prongs 24—24 similar in construction to the prongs 15—15 of my first form of fastener are pressed from the edges of opposite ends of the plate intermediate to the prongs 22—22 and 23—23. The prongs 24—24 have the notches 25 on their free edges and are slightly bow-shaped in cross-section. The fastener is attached to the studding 2 and the panels 3 and 4 are installed with it in the manner of my first form. In my modified form, however, as illustrated in Figs. 7–9, the prongs 22—22 and 23—23 will project through the wallboard and into embedding relation with the strip 5. As the prongs are slightly curved at their free ends they will flatten out to a degree as they penetrate the finishing strip during attachment thereby preventing their easy unloosement from the strip and, as a result, all the parts will be securely assembled together. The strip 5 will conceal the line 17 formed where the panels 3 and 4 are brought together and an attractive appearance will be given to the visible surface of the assembly.

In Fig. 13 I have illustrated the wallboard panels 3 and 4 joined to the studding 2 by means of a third form of fastener which is similar in construction to that represented in Figs. 10–12, but whose panel-engaging prongs 26 are relatively shorter as no finishing strip is attached to the wallboard.

I realize that minor changes may be made in the form and construction of the invention without departing from the material scope thereof. For that reason I prefer to limit myself, not by the foregoing description, but by the following claims.

1. A fastener of the class described comprising a rectangular metal plate and a pair of prongs pressed from each of two opposite edges of said plate and extending outwardly therefrom whereby wallboards may be attached thereto, each of said prongs being located adjacent to a corner of said plate and each of said prongs being slightly curled at their free ends whereby better holding qualities are provided when embedded in building material, and a pair of prongs extending outwardly from said plate in a direction opposite to that of said first named prongs for attachment to a supporting structure, each of said oppositely-extending prongs being located at opposite edges of said plate and intermediate to each pair of said first named prongs, and each of said oppositely-extending prongs being slightly bow-shaped in cross-section whereby they will have greater strength for attaching purposes.

2. A fastener of the class described comprising a substantially square metal plate having two pairs of triangular-shaped prongs pressed outwardly therefrom, each of said pairs extending from opposite ends of said plate and each of said prongs being located near the edges of said ends and adjacent to a corner of said plate, said prongs being slightly curled at their free ends for holding purposes when embedded in building material, and a pair of triangular-shaped prongs extending from said plate in a direction opposite to that of said first named prongs, each of said latter prongs being located at opposite ends of said plate and intermediate to each pair of said first named prongs, said latter prongs being slightly bow-shaped in cross-section and having a notched formation on their free edges whereby a better gripping surface is provided when said latter prongs are embedded in a supporting structure.

3. A fastener of the class described comprising a metal plate and a plurality of attaching prongs pressed from said plate and positioned at stated points around the outer edge thereof, at least two of said prongs extending upwardly from said plate for attachment to a supporting structure, said upwardly-extending prongs having a notched formation on their free edges whereby an improved frictional engaging surface is provided on said prongs and said prongs being slightly bow-shaped in cross-section, the remainder of said prongs extending from said plate in a direction opposite to that of said upwardly-extending prongs whereby building materials may be attached thereto, said remaining prongs being curled outwardly at their free ends and at least two of said remaining prongs being of greater length than said other remaining prongs.

4. A fastener of the class described comprising a metal plate having parallel sides, a portion of each side having been cut away from opposite ends in lines parallel to said sides toward the center of said plate, a pair of prongs extending outwardly from said plate and adapted to pass through said wallboards and into embedding relation with a finishing strip, each of said prongs being located on opposite sides of said plate and positioned adjacent to that portion of said plate bounding the ends of said cut-away portions, a pair of prongs located adjacent to each end of said plate and extending outwardly from said plate in the same direction as said first named prongs, said second named prongs being relatively shorter than said first named prongs and adapted to enter into embedding relation with said wallboards, and each of said named prongs being slightly curved at their free ends whereby a means is provided for securing said prongs with their respective parts, and a pair of prongs extending from said plate in a direction opposite to that of said named prongs, each of said oppositely-extending prongs being located at opposite ends of said plate and adjacent to the edges of said ends, said last named prongs being slightly bow-shaped in cross-section and having a notched formation on their free edges whereby a better gripping surface is provided when they are embedded in a supporting structure.

5. A fastening installation comprising, in combination, a supporting structure, a pair of wallboard panels having an edge of a side of one adjacent to an edge of the side of another, a finishing strip superposed upon the seam formed by said adjacent panels and a fastener member assembled therewith, said fastener member comprising a metal plate located between said supporting structure and said wallboards and a number of attaching prongs pressed from said plate and positioned at stated points around the edge thereof, at least two of said prongs extending from said plate into embedding relation with said supporting structure, and a plurality of remaining prongs extending from said plate in a direction opposite to that of said support-engaging prongs, some of said remaining prongs being in embedded relation with the panels of said wallboard, others of said prongs extending through said wallboard into embedding relation with said finishing strip, the ends of said remaining prongs having initially curled points whereby said ends will be flattened to some degree when embedded with their respective parts.

6. A fastening installation comprising, in combination, a building studding, a pair of wallboard panels having an edge of a side of one adjacent to an edge of the side of another, a finishing strip superposed upon the seam formed by said adjacent panels and a fastener member assembled therewith, said fastener member comprising a metal plate located between said building studding and said wallboard panels and having a pair of triangular-shaped prongs pressed from the edges of opposite ends of said plate and extending into embedding relation with said studding, said prongs having a notched formation on their free edges and said prongs being slightly bow-shaped in cross-section whereby said prongs will have greater strength for attaching purposes, a pair of prongs extending from each of the same opposite edges as said first named prongs in an opposite direction to that of said first named prongs and into embedding relation with said wallboard panels, and a pair of prongs extending from opposite edges of said plate intermediate to the opposite ends of said plate, said prongs projecting through said panels and into embedding relation with said finishing strip, the free ends of the prongs embedded in said wallboard and said finishing strip being initially curved before entrance into their respective materials whereby said ends will be substantially flattened when embedded in said materials.

7. A fastening installation comprising, in combination, a supporting structure, a wallboard and a fastening strip superposed upon each other in said order, and a fastener member assembled therewith, said fastener member comprising a metal plate located between said supporting structure and said wallboard, and a plurality of attaching prongs attached to said plate, a number of said prongs extending from said plate into embedding relation with said supporting structure, the remainder of said prongs extending from said plate in a direction opposite to that of said first prongs, some of said remaining prongs being in embedded relation with the panels of said wallboard, other of said prongs extending through said wallboard into embedding relation with said finishing strip whereby all of said parts are securely held in assembled relation.

8. A fastener of the class described comprising a metal plate and a plurality of attaching prongs integral with said plate, at least two of said prongs extending in one direction from said plate for attachment to a supporting structure, the remainder of said prongs extending from said plate in a direction opposite to that of said two prongs whereby building material may be attached thereto, at least some of said remainder prongs having initially bent ends to cause them to curl outwardly when embedded into the building material and some of said remainder prongs being longer than the others at that same side of the plate for the purposes illustrated and described.

CARY C. WILSON.